United States Patent [19]

Ahvenainen et al.

[11] Patent Number: 5,273,762
[45] Date of Patent: Dec. 28, 1993

[54] METHOD FOR THE FERMENTATION OF BEER

[75] Inventors: Juha Ahvenainen, Helsinki; Jukka Kuhanen, Jokioinen, both of Finland

[73] Assignee: Suomen Sokeri Oy, Helsinki, Finland

[21] Appl. No.: 941,855

[22] Filed: Sep. 8, 1992

Related U.S. Application Data

[63] Continuation of Ser. No. 526,873, May 22, 1990, abandoned.

[51] Int. Cl.$^5$ .............................................. C12C 11/04
[52] U.S. Cl. ........................................ 426/11; 426/13; 426/16; 426/661
[58] Field of Search ............... 426/16, 11, 13, 578, 426/661

[56] References Cited

U.S. PATENT DOCUMENTS

| | | | |
|---|---|---|---|
| 4,038,420 | 7/1977 | Pollack et al. | 426/16 |
| 4,054,671 | 10/1977 | Eslick et al. | 426/16 |
| 4,207,345 | 6/1980 | Van Gheluwe et al. | 426/11 |
| 4,666,718 | 5/1987 | Lowery et al. | 426/13 |
| 5,013,561 | 5/1991 | Goering et al. | 426/28 |

FOREIGN PATENT DOCUMENTS

| | | |
|---|---|---|
| 240210 | 8/1988 | European Pat. Off. |
| 56552 | 10/1979 | Finland . |
| 1202976 | 8/1970 | United Kingdom . |
| 1203623 | 8/1970 | United Kingdom . |
| 1387998 | 3/1975 | United Kingdom . |
| 1540552 | 2/1979 | United Kingdom . |

OTHER PUBLICATIONS

Starch Hydrolysis Products as Brewing Adjunts, Sep. 1986, Cereal Foods World, vol. 31, No. 9, Hebeda et al.
Cereal Research in Brewing: Cereals as Primary Brewing Ingredients, Sep. 1986, Cereal Foods World, vol. 31, No. 9, Thomas et al.
Cereal Research in Brewing: Cereals as Brewers' Adjuncts, Sep. 1986, Cereal Foods World, vol. 31, No. 9, Pyler et al.

*Primary Examiner*—Helen F. Pratt
*Attorney, Agent, or Firm*—Baker & McKenzie

[57] ABSTRACT

The invention relates to a process for the production of beer by fermenting wort comprising malted barley and a concentrated starch solution derived from barley, for example, in the form of the secondary fraction from a barley starch process, or a barley syrup derived from such fraction.

4 Claims, No Drawings

METHOD FOR THE FERMENTATION OF BEER

This application is a continuation, of application Ser. No. 526,873, filed May 22, 1990, now abandoned.

TECHNICAL FIELD

The invention relates to a method for the fermentation of beer. In one specific aspect, the invention relates to production of beer by partially replacing malt with a starch-containing mixture, a so called "secondary" fraction or fraction "B" obtained from a barley starch process. The secondary fraction can be added as is, added in the form of a syrup or in some other concentrated form.

BACKGROUND OF THE INVENTION

The brewing of beer is an ancient art. Ancient records suggest that malting and fermentation of cereals to produce "beer" commenced between about 2000 B.C. and 3000 in Mesopotamia. The basic ingredients for beer have remained unchanged over the centuries: barley, malt, water, hops and yeast. The process for brewing beer consists essentially of the following steps:

Malting barley by germination. The purpose of malting is to bring forth enzymes that break down starch and proteins to less complex water-soluble compounds, i.e. amino acids, fermentable sugars and small peptides;

Crushing the malted barley to create a "grist";

Adding water to the grist to create a mash;

Separating the resulting aqueous extract, known as the "wort" which is rich in fermentable sugars and other nutrients;

Boiling the wort with hops to add flavors and to stop enzymatic action;

Cooling and clarifying the wort;

Fermenting the wort with yeast to convert glucose to ethanol and carbon dioxide ("primary fermentation") to produce the "green" or "young" beer;

Maturing or "lagering" the fermented green or young beer, generally by means of "secondary fermentation", again using yeast;

Filtering, pasteurizing and packaging the beer.

A generally known practice is to replace malted barley with a so called brewing adjunct, or use such an adjunct in addition to malt as a beer raw material. Suitable brewing adjuncts include maize, rice, sugar and various syrups. A brewing adjunct used in the production of a wort, such as maize, is usually crushed and a mash formed separately from the malt mash by adding enzymes (The Practical Brewer 1977, ed. H. M. Broderick). Prehydrolyzed products can be mixed with the malt mash, and syrups can be added to the wort at the time the wort is boiled as described above. The use of brewing adjuncts needs to be carefully controlled in order to produce beer of acceptable taste and color. The use of adjuncts made from maize, rice and other grains expands the brewing ingredients beyond the traditional ones listed above; this is not possible in countries like Germany, where the Beer Purity Laws enacted in 1516 (the "Reinveitssehot") which limit brewing ingredients to barley malt, water, hops and yeast, are still followed.

Surprisingly, it has now been discovered that malt can be partially replaced with a starch-containing mixture obtained as a secondary fraction from a barley starch process, while the "mashing" water is partially replaced with the water contained in the mixture. The pH of the starch-containing mixture is low, so the addition of acid at the mashing step (often done) is not necessary. Malt usually contains an excess of amylolytic enzymes, so up to 30% of the malt can be replaced with a starch fraction at the mashing step without the need to add enzymes. If necessary, gluconase or cellulase enzymes can be added to the mash for improved filterability.

It is also possible to produce a barley syrup from a starch-containing mixture obtained as a secondary fraction from a barley-starch process, and use the syrup to replace malt. The production of a syrup is carried out by liquefying, saccharifying, filtration and concentration procedures well known in the art. Other concentrated forms of a starch containing mixture can also be used. The resultant barley syrup can also be used as raw material in a brewing process. An advantage of barley syrup is that it has good storage properties and can be added to the wort at the beginning of the fermentation step. This increases the capacity of the brewery and makes it easy to increase the concentration of the wort in a so called high gravity process. Other forms of concentrated starch containing mixture derived from barley could also be used to substitute for malt in the brewing process.

SUMMARY OF THE INVENTION

The present invention provides for a method for the production of beer comprising the steps of mashing and crushing barley and adding water to create a mash, and adding thereto a concentrated starch solution derived from barley in sufficient amounts that the wort extract derived therefrom is comprised of between about 2% and about 60% by weight of the concentrated starch solution, and fermenting and maturing beer from this wort. In one specific aspect, the concentrated starch solution is derived from a barley starch process, in particular, the secondary fraction from said barley starch process. The concentrated starch solution may be comprised of starch in concentrations of between about 60% to about 98% by weight based on dry substance, with a starch concentration of about 68% by weight being particularly preferred.

The concentrated starch solution may also comprise between about 2% to about 50% protein by weight based on dry substance. In a preferred embodiment, the pH of said concentrated starch solution is between about 3.5 to about 6.

In another specific aspect, the concentrated starch solution is a barley syrup comprising between about 60% to about 90% by weight of fermentable sugars on a dry substance basis. The concentrated starch solution may also contain proteins in the amount of between about 0.1% to about 3% protein by weight based on dry substance.

In the particularly preferred embodiment, the concentrated starch solution derived from barley comprises between about 10% to about 30% by weight of the wort which is produced from the mash.

DETAILED DESCRIPTION OF THE PREFERRED EMBODIMENT

A. General

Finnish Patent No. 56552 describes a process for the production of pure starch from barley ("barley starch process"). Also, a process is known for the production of starch from wheat, in which a primary or pure fraction "A" containing large starch granules and a secondary or fraction "B" containing more impurities and small starch granules can be separated (see Selley & Wookey, *Glucose Syrups and Related Carbohydrates*. ed. Biroh, Green & Coulson, Elsevier Publishing Company, Ltd., London, 1970). In the barley starch process, it is also possible to separate two fractions, A and B, on the basis of the purity of starch. The total yield of the process is improved with respect to starch when two fractions, A and B, are separated, as compared with the separation of a single fraction containing pure starch. (In the specification, reference to "fraction B" shall refer to the secondary fraction obtained from a barley starch process as described herein.)

The production of syrup from cereals for use in fermentation is known per se (GB Patent 1 203 623). It is also known to use various cereals and syrups in brewing. Canales, *Brewing Science*, ed. J. R. A. Pollock, Academic Press, London, 1979).

Economically, the use of fraction B in a brewing process is advantageous over malt and pure starch. As compared with the use of barley, many technological advantages are obtained: better dosing properties, better filterability of wort, decreased demand for addition of mashing water, natural pH adjustment by addition of an acid fraction, and more efficient extraction. Surprisingly enough, the use of fraction B produces beer of a very high quality and excellent taste.

Syrup manufactured from fraction B has a greater purity that malt extract with respect to proteins, color, ash and polyphenols. It improves the stability of beer and the resultant beer is lighter. It nevertheless contains barley-originated taste and flavour substances typical of beer. The sugar composition of the syrup can be adjusted as desired. A typical sugar composition resembles that of conventional wort, i.e. it contains mainly maltose.

For commercial brewers, the use of the invention does not require any substantial modifications or further investments. In particular, the use of the process— which utilizes a starch-containing mixture—as beer raw material is a major economical and technological advantage when the starch plant is located in the immediate vicinity of the brewery, e.g., in an integrated barley starch/starch sweetener/soft drink/beer factory.

A starch fraction which contains between about 60% to about 98% of starch by weight (based on dry substance) is preferred, with a starch fraction of about 68% being particularly preferred. Typical secondary fractions obtained from a barley starch process which can be used for the method of the instant invention have the following characteristics:

| | |
|---|---|
| Protein content: | between about 2% to about 15% by weight (d.s.) |
| Starch content: | between about 60% to about 98% by weight (d.s.) |
| Water: | between about 60% to about 85% by weight |
| pH: | between about 4 and about 5. |

The exact composition will vary based on the process conditions and mode of operation. It is important that the primary fraction contains starch as pure as possible (at least 90% and preferably more than 98% on a dry substance basis); the primary fraction is separated from the secondary fraction, fraction B (which contains more impurities) separately. The proportions of fractions A and B may also vary; a typical proportion is 70% of fraction A and 30% of fraction B, calculated on a dry substance basis.

B. Experimental

Example 1:

Production of a Barley Starch Mixture Fraction 1000 kg of dry barley was dehulled with a resultant weight loss of about 10%. Resultant barley was soaked for 12 hours in water having a temperature of 30° C. (approx. 1000 l), and then the kernels were ground by stone mills and the slurry was screened by means of a screening device in a manner described in Finnish Patent No. 56552. After screening a starch-containing fraction was separated in a hydrocyclone into two fractions: a primary starch fraction A, and a secondary starch fraction B. Fraction A had a starch purity higher, and starch fraction B contains proteins and other slowly settling substances. After separation of the two fractions, starch fraction B was concentrated by centrifugation using method and equipment well known in the art.

The substance balance of the process appears from the following formula:

Barley 1000 kg (dry substance)

| | |
|---|---|
| → barley hull | 100 kg |
| → screening surplus | 320 kg (d.s.) |
| → starch fraction A | 400 kg (d.s.) |

Starch fraction B
140 kg (dry substance)
Analysis of starch fraction B:

| | |
|---|---|
| Protein | 11.5% by weight based on dry substance |
| Starch | 67.1% by weight based on dry substance |
| Water | 79.3% |
| pH | 4.6 |
| Reducing sugar (DE) | 5% (DE = Dextrose equivalent) |

Example 2:

Fermentation of Beer Utilizing a Barley Starch Containing Side Fraction

Starch fraction B prepared in accordance with Example 1 was utilized to replace malt in the beer brewing process. Starch fraction B (prepared in accordance with Example 1) was added to crushed, malted barley at the mashing step so that about 25% of the resulting wort extract originated from the added starch fraction, and the remaining originated 75% from the malt.

| 100 l of wort was prepared as follows: | |
|---|---|
| Malt | 14.4 kg |
| Starch fraction | 16.8 kg (20.7% of d.s.) |
| Calcium chloride | 30 g |
| Water | 85 l |

The malt was crushed and mixed with water simultaneously with the starch fraction. The mash was stirred and its temperature was increased by about 1° C./min with the pauses held as follows:

| | |
|---|---|
| 50° C. | 30 min |

| | |
|---|---|
| 63° C. | 20 min |
| 72° C. | 30 min |
| 78° C. | 10 min |

After mashing, the mash was filtered by means of a vessel of the same type as the lauter tun used in breweries and well known to those skilled in the art. Solid matter was separated from soluble material and washed at three steps with 78° C. water.

The resultant wort was introduced into a cooking vessel and was cooked and flavored with hops according to conventional brewing processes well known to those skilled in the art. The sediment formed during the cooking step was separated in a whirlpool in accordance with techniques well known in the art; the wort was cooled and aerated for fermentation.

| Analysis of wort: | |
|---|---|
| Extract concentration: | 11.0% by weight |
| Alpha-amino nitrogen | 204 mg/l |
| Bitterness | 31 EBU |
| Color | 4.5 EBC |
| pH | 5.4 |

Conventional bottom fermenting layer of yeast was added to the wort Yeast: VTT-A-63015, Technical Research Centre of Finland, Biotechnical Laboratory. The main fermentation took place at 10° C. and lasted seven days, whereafter a secondary fermentation followed (10° C., 4 weeks). The fermentation was carried out by means known to those skilled in the art. The beer was tested for its quality by analytical and sensory evaluation.

| Analysis of beer: | | |
|---|---|---|
| Alcohol | 3.70% by weight | |
| Extract | | |
| apparent | 2.15% by weight | |
| real | 3.85% by weight | |
| Degree of | | |
| fermentation | | |
| apparent | 80.5% | |
| real | 65.0% | |
| pH | 4.45 | |
| Color | 3.5 EBC | |
| Bitterness | 22 EBU | |

The resulting beer was observed to have acceptable flavor and taste.

Example 3:

Production of a Barley Syrup

A starch fraction B was prepared in accordance with Example 1. The pH of the starch fraction B obtained form a barley starch process (1000 l, 20% of dry substance) was raised to 6.2 by the addition of 3% potassium hydroxide solution, and the resulting mixture liquefied in a jet cooker at 100° C. for about five minutes, and thereafter in a liquefaction reactor at 85° C. for about two hours. A thermostable alpha-amylase (available under the trademark SPEZYME AA 20, manufacturer Cultor Ltd) was added at a dose level of 1 l/tn on a dry substance basis. After liquefaction the amount of the reducing sugar (DE) was about 20% by weight.

Protein sediment was removed from the resultant slurry by centrifugation and the surplus was cooled to about 58° C. The pH was adjusted to about 5.7. Beta-amylase derived from barley (available under the trademark SPEZYME BBA 1500, manufacturer Cultor Ltd) was added. Saccharification time was about 24 hours.

The syrup was filtered by means of a vacuum drum filter through a layer of diatomaceous earth, and was then passed through a cation exchanger (DOWEX 88, manufacturer Dow Chemicals) and through an anion exchanger (DOWEX 66, manufacturer Dow Chemicals). The syrup was concentrated by evaporation.

| The analysis of the resulting syrup is as follows: | |
|---|---|
| Dry substance | 69.1% |
| Reducing sugar (DE) | 48.8% |
| pH | 4.2 |
| Color | 1295 ICUMSA |
| Ash | 1.0% by weight on d.s. |
| Protein | 0.2% by weight on d.s. |
| Glucose | 22.7% by weight on d.s. |
| Maltose | 43.1% by weight on d.s. |
| Maltotriose | 13.9% by weight on d.s. |

Example 4:

Fermentation of Beer Using Barley Syrup

In this example, a barley syrup prepared in accordance with Example 3 was used to replace malt in a traditional brewing process to brew beer with excellent taste characteristics. 49% of the malt was replaced with the barley syrup made in accordance with Example 3.

Wort was prepared by mixing crushed malt (10.5 kg) with water (50 l) and by mashing the solution in accordance with the following temperature program:

| | |
|---|---|
| 48° C. | 15 min |
| 78° C. | 50 min |
| 78° C. | 10 min |

The mash was filtered in accordance with procedures well known in the art, and the wort was introduced into a wort copper to which the barley syrup (prepared by the method of Example 3) (10.2 kg, 69.1% by weight of dry substance) was added. As compared with conventional all-malt wort, hops were added to the wort copper in an amount of 70% with respect to the bitterness concentration. After cooking in accordance with procedures well known in the art, the precipitate was separated in a whirlpool, the wort was cooled, aerated and yeast was added for primary fermentation.

An analysis of the composition of the resulting wort was as follows:

| | | |
|---|---|---|
| Extract | 12.3% by weight | |
| Bitterness | 28 EBU | |
| Color | 7.5 EBC | |
| pH | 4.8 | |
| Free alpha-amino nitrogen | 121 mg/l | |
| Coagulating nitrogen | 21 mg/l | |
| Fermentation rate | | |
| apparent | 86.1% | |
| real | 69.7% | |

The primary and secondary fermentation was carried out as in Example 2 herein. Both analytical and sensory evaluation showed that the qualities of the beer were equal to conventional all-malt beer. A taste comparison between the beer using a conventional all malt and the method of the instant invention revealed no significant distinction between the two beers.

| Analysis of beer: | |
|---|---|
| Alcohol | 4.20% by weight |
| Extract | |
| apparent | 2.15 by weight |
| real | 4.05 by weight |
| Degree of fermentation | |
| apparent | 82.5% |
| real | 66.5% |
| Bitterness | 14 EBU |
| Color | 6.0 EBC |

Sensory evaluation of the beer by trained testers resulted in a mark of 4 (on a scale of 1 to 5, with 1 =poor, 5 =excellent).

The foregoing general discussion and experiment examples are intended to be illustrative of the present invention and are not to be considered as limiting. Other variations within the scope and spirit of this invention are possible, and will present themselves to those skilled in the art.

We claim:

1. A method for the production of an organoleptically acceptable beer comprising the steps of:
    producing wort by crushing barley malt and adding sufficient water to create a workable mash;
    adding to said mash containing starch in order to augment the starch present, a barley secondary starch fraction containing starch and protein, said barley secondary starch fraction is a barley starch syrup derived from a secondary fraction of barley starch process, said barley secondary starch fraction comprised of (1) starch in concentration of between about 60% to about 90% by weight of fermentable sugars based on dry substance; (2) between about 2% to about 15% protein by weight based on dry substance; and (3) at least 15% water based on dry substance,
    said barley secondary starch fraction added in sufficient quantities so that the wort extract derived from said mash is comprised of between about 5% to about 60% by weight of said added barley secondary starch fraction;
    the pH of said barley secondary starch fraction is between about 3.5 to about 6;
    extracting a wort from said mash; and
    fermenting and maturing an organoletpically acceptable beer from said wort.

2. The method in accordance with claim 1 wherein said organoleptically acceptable beer is brewed only from water, barley, hops and yeast.

3. The method in accordance with claim 2 wherein said syrup comprises between about 0.1% to about 3% protein on a dry substance basis.

4. The method in accordance with claim 3 wherein said barley secondary starch fraction comprises between about 10% to about 30% by weight of wort extracted from said mash.

* * * * *